(12) United States Patent
Ando

(10) Patent No.: US 9,789,877 B2
(45) Date of Patent: Oct. 17, 2017

(54) INFORMATION TRANSMITTER

(71) Applicant: DENSO CORPORATION, Kariya, Aichi-pref. (JP)

(72) Inventor: Motonori Ando, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 78 days.

(21) Appl. No.: 14/669,064

(22) Filed: Mar. 26, 2015

(65) Prior Publication Data

US 2015/0274173 A1    Oct. 1, 2015

(30) Foreign Application Priority Data

Mar. 28, 2014   (JP) .................................. 2014-069762

(51) Int. Cl.
    *B60W 40/072*    (2012.01)
    *G08G 1/0965*    (2006.01)
    *G08G 1/16*    (2006.01)

(52) U.S. Cl.
CPC ........... *B60W 40/072* (2013.01); *G08G 1/162* (2013.01); *G08G 1/166* (2013.01); *G08G 1/167* (2013.01); *B60W 2750/40* (2013.01)

(58) Field of Classification Search
None
See application file for complete search history.

(56) References Cited

U.S. PATENT DOCUMENTS

| 2002/0042668 | A1 | 4/2002 | Shirato et al. | |
| 2004/0138809 | A1* | 7/2004 | Mukaiyama | G08G 1/096716 701/400 |
| 2007/0005218 | A1* | 1/2007 | Ueyama | B60W 30/16 701/96 |
| 2010/0265048 | A1* | 10/2010 | Lu | B60Q 9/005 340/435 |
| 2012/0143486 | A1* | 6/2012 | Koike | G08G 1/163 701/301 |

FOREIGN PATENT DOCUMENTS

| JP | 2002-109695 | 4/2002 |
| JP | 2004-185428 | 7/2004 |
| JP | 2006-318093 | 11/2006 |
| JP | 2008-077309 | 4/2008 |
| JP | 2009-093343 | 4/2009 |
| JP | 2012-098781 | 5/2012 |

* cited by examiner

*Primary Examiner* — Rami Khatib
*Assistant Examiner* — Nicholas K Wiltey
(74) *Attorney, Agent, or Firm* — Harness, Dickey & Pierce, P.L.C.

(57) ABSTRACT

An in-vehicle device has a calculator which obtains subject vehicle information, detects a vehicle in a preset range based on a detection signal from a laser radar for obtaining a vehicle detection result, obtains a curvature of a road, and determines whether the curvature of the road is equal to or smaller than a threshold. If the radius is less than the threshold, a packet having data regarding the subject vehicle information, range position information, and vehicle presence information is generated. If the radius exceeds the threshold, a packet having data regarding the subject vehicle information is generated. The generated packet is then transmitted to an outside of a subject vehicle.

8 Claims, 4 Drawing Sheets

INFORMATION TRANSMITTER

CROSS REFERENCE TO RELATED APPLICATION

The present application is based on and claims the benefit of priority of Japanese Patent Application No. 2014-069762, filed on Mar. 28, 2014, the disclosure of which is incorporated herein by reference.

TECHNICAL FIELD

The present disclosure generally relates to an information transmitter installed and used in a vehicle.

BACKGROUND INFORMATION

Conventionally, an information transmitter or a similar device is used for vehicle-to-vehicle communications, in which a vehicle position as well as a travel state of a vehicle and/or obstacle around the vehicle are transmitted to a near-by vehicle that has an information receiver for a notification to a driver in the near-by vehicle and for safety of such vehicle in terms of avoiding a collision and/or an automated safety operation. Such information communications are provided by a drive support system.

The received information is used for performing various controls for the benefit and safety of the driver by receiving various types of information via the vehicle-to-vehicle communications and the information receiver. However, sometimes the information may not be beneficial for the receiving side, especially when the transmitted information has low or non-reliable information contents.

SUMMARY

The present disclosure provides an information transmitter that prevents an inappropriate operation on a receiver side. In an aspect of the present disclosure, the information transmitter used in a subject vehicle includes a data transmission section wirelessly transmitting data directly or indirectly to an information receiver of another vehicle, a vehicle position detector detecting a position of the subject vehicle by obtaining position determining information, a vehicle detector detecting a vehicle within a preset range that is positioned in front of the subject vehicle, a curvature obtainer obtaining a curvature of a road located in front of the subject vehicle, and a transmission controller controlling the data transmission section to transmit (i) range position information regarding a position of the preset range and (ii) vehicle presence information regarding whether the vehicle detector has detected any vehicle within the preset range. When the curvature of the road obtained by the curvature obtainer is equal to or smaller than a threshold, the transmission controller controls the data transmission section to transmit the range position information and the vehicle presence information, and when the curvature of the road obtained by the curvature obtainer is greater than the threshold, the transmission controller controls the data transmission section to not transmit at least one of the range position information or the vehicle presence information.

The information transmitter having the above-described configuration changes information contents of the transmitted information according to the curvature of the road in front of the vehicle having the information transmitter. When the curvature of the road is great, i.e., when the road in front of the subject vehicle is a curved road, the preset range in front of the subject vehicle may possibly include an out-of-road area. In such case, the detection results from the vehicle detector may not be the information that is usable for a safety-related control process/operation in the subject vehicle.

The information transmitter of the present disclosure prevents such an inconvenient or inappropriate control process on the receiver side by not transmitting one of the range position information and the vehicle presence information when the curvature of the road in front of the subject vehicle is great.

The numerals in the claims that are parenthesized are simply indicating a relationship between the embodiment and the numeral assigned elements, and not limiting the scope of such elements at all.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
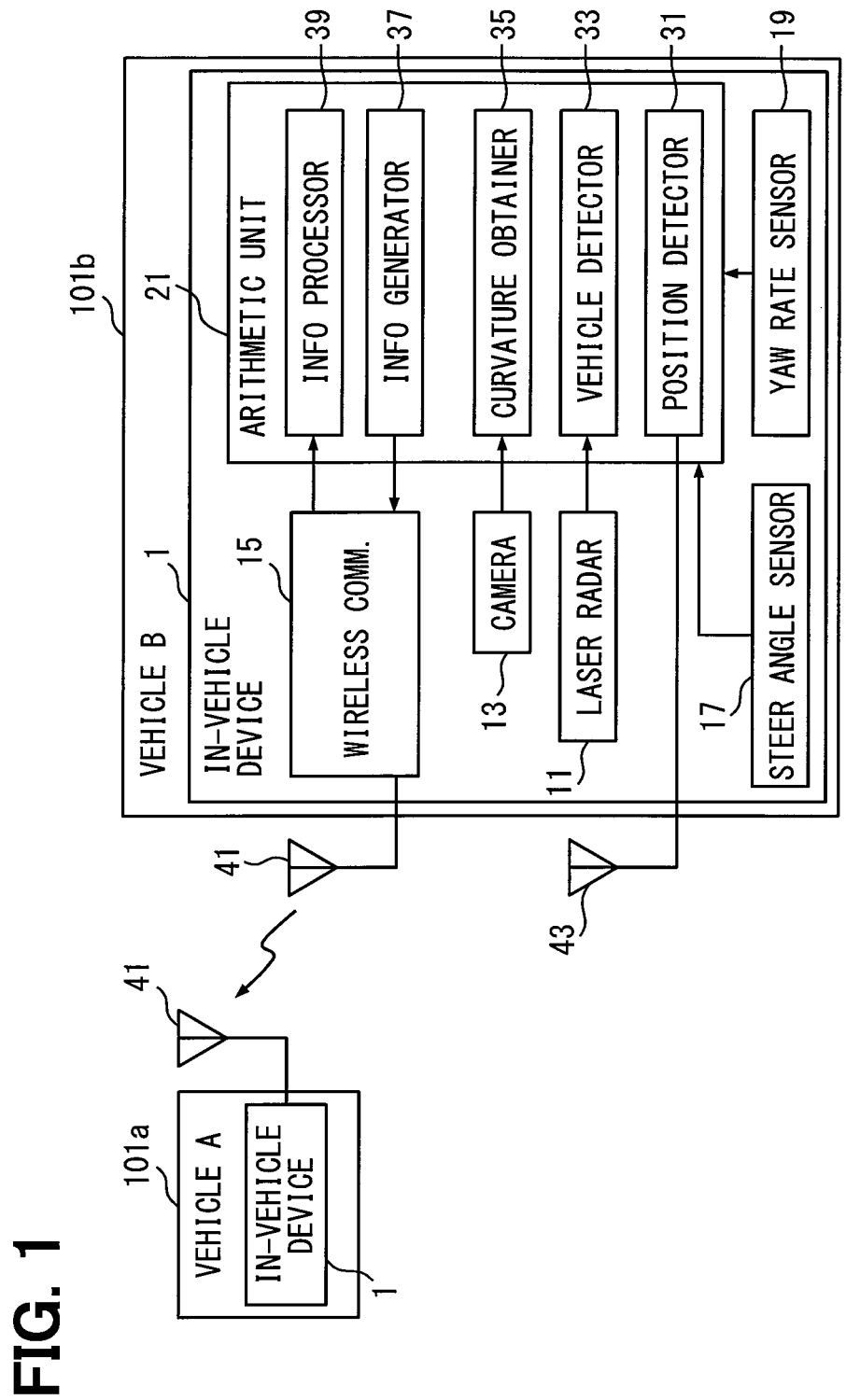
FIG. 1 is a block diagram of an in-vehicle device in an embodiment of the present disclosure.

The embodiment of the present disclosure is described with reference to the drawing. The present disclosure is not limited to the following embodiments, and, as long as it pertains to a technical scope of the disclosure, may take various forms.

[First Embodiment]

(1) Entire Configuration

An in-vehicle device 1 of the present embodiment is installed and is used in a vehicle 101 (i.e., 101*a*, 101*b*) as shown in FIG. 1. In the following description, the in-vehicle device 1 in a vehicle A (i.e., the vehicle 101*a*) is an in-vehicle device on a receiving side, which receives information, and the device 1 in a vehicle B (i.e., the vehicle 101*b*) is an in-vehicle device on a transmitting side, which transmits information. The in-vehicle device 1 is an example of an information transmitter and an example of an information receiver in the present disclosure.

The in-vehicle device 1 comprises plural devices arranged at various positions of the vehicle 101, and is provided with a laser radar 11, a camera 13, a radio communicator 15, a steering angle sensor 17, a yaw rate sensor 19, a calculator 21, etc.

The laser radar 11 is a device that emits a laser beam and obtains a reflected light of the laser beam. The detection signal of the reflected light is outputted to the calculator 21.

In the calculator 21, a relative position of an other vehicle relative to a subject vehicle, i.e., the vehicle 101 having the in-vehicle device 1, is calculated based on the above-mentioned detection signal.

The laser radar 11 may be a device other than a laser radar, as long as it is capable of detecting existence of vehicles. For example, a millimeter-wave radar may be used as the radar 11. The vehicle in a preset range may be detected based on an image that is captured by a camera for imaging a front field of the subject vehicle.

The camera 13 is an imager, e.g. a camera which may use a CCD camera or an image pick-up tube, or an infrared camera which can capture an infrared image, and is disposed at a front part of the subject vehicle and at the center of the width of the vehicle, for repeatedly capturing an image containing a road surface in a travel direction of the subject vehicle, at predetermined time intervals (e.g., every 1/10 seconds). The image captured by the camera 13 is outputted to the calculator 21.

The radio communicator 15 is vehicle-to-vehicle communication equipment which performs wireless transmission of the data (i.e., subject vehicle information, range position information, vehicle presence information) which is generated by the in-vehicle device 1 periodically to unspecified number of other vehicles which exist or travel around the subject vehicle. The other vehicles existing/traveling around the subject vehicle are, more practically, vehicles within a communication area of electric wave from an antenna 41 of the subject vehicle. Further, in the present embodiment, the in-vehicle device 1 of the subject vehicle is also disposed on the other vehicles as an assumption, which means that the radio communicator 15 receives the above-mentioned data from the other vehicles.

The steering angle sensor 17 is a sensor which measures a steering angle of a steering wheel.

The yaw rate sensor 19 is a sensor which detects an angular velocity (i.e., a yaw rate) toward a turning direction of the subject vehicle.

The calculator 21 is a well-known microcomputer which consists of a CPU, a ROM, a RAM, and a bus line which connects the CPU and the ROM/RAM, etc. which are not illustrated. The calculator 21 performs various processes based on a program memorized by the ROM. In the present embodiment, the calculator 21 functions as a vehicle position detector 31, a vehicle detector 33, a road curvature obtainer 35, an information generator 37, and an information processor 39.

The vehicle position detector 31 detects, or identifies, a position of a Global Navigation Satellite System (GNSS) antenna 43, i.e., the current position of the subject vehicle based on a signal (i.e., information that is usable for detecting a position of the subject vehicle) outputted from artificial satellites for GNSS and received with the GNSS antenna 43. It should be understood to one of ordinary skill in the art that GNSS includes Global Positioning System (GPS) and other satellite-based positioning systems, etc.

The vehicle detector 33 detects vehicles which exist in the preset range in front of the subject vehicle based on the detection signal of the laser radar 11. The preset range is a range in which the laser radar 11 is capable of detecting a vehicle, which is defined as a range that is smaller than a maximum detection range of the radar 11. The preset range is defined with reference to the subject vehicle. Therefore, when the current position of the subject vehicle is detected, the position of the preset range may also be detected.

The road curvature obtainer 35 extracts a lane division line from the road surface image that captures the road surface in a travel direction of the subject vehicle, and calculates the curvature of the road in the travel direction based on the extracted lane division line. The curvature of the road may be calculated for the road within the preset range described above.

The information generator 37 generates the data that is indicative of the subject vehicle information, the range position information, and the vehicle presence information, and transmits such information via the radio communicator 15. The subject vehicle information is information which shows a travel state of the subject vehicle, including the current position of the subject vehicle detected by the vehicle position detector 31. The range position information is information which shows the position of the preset range mentioned above. The position of the preset range may be detectable based on the current position of the subject vehicle and the position the preset detection range of the laser radar 11 for detecting a vehicle with reference to the position of the subject vehicle. The vehicle presence information is information which shows that no vehicle exists in the above-mentioned preset range.

The information processor 39 performs a safety-related process based on the above-described information when the in-vehicle device 1 receives the above-described information.

(2) Reliability of Information about Vehicle Detection

In the present embodiment, the in-vehicle device 1 transmits, to the in-vehicle device 1 that is disposed in the other vehicle, the range position information and the vehicle presence information on two conditions that (i) no vehicle existing in a preset range 107 and (ii) the curvature of the road is equal to or less than a preset threshold.

How to determine a reliability of the information about the vehicle detection is described using FIGS. 2 to 5. In FIGS. 2 to 5, vehicles, roads, and other objects and relationships among them are drawn only illustratively, which may be slightly out of scale or may be different from an actual scale.

Figure 2:
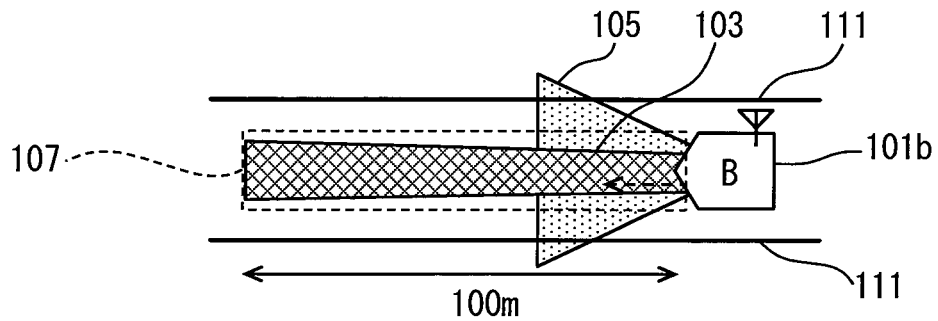
FIG. 2 is an illustration of a situation around a subject vehicle in which no vehicle exists in front of the subject vehicle.

The calculator 21 of the in-vehicle device 1 of the vehicle 101 b, which is traveling in a travelable range on a road defined by lane division lines 111 as shown in FIG. 2, determines whether a vehicle exists in the preset range 107 based on a detection of a vehicle in a detection range 103 of the laser radar 11, and calculates the curvature of the road based on the lane division line 111 captured in a capture range 105 of the camera 13 which enables a calculation of the curvature of the captured lane division line 111.

In an example shown in FIG. 2, since no vehicle exists in the detection range 103, the in-vehicle device 1 of the vehicle 101b determines that no vehicle exists in the preset range 107. Further, the in-vehicle device 1 determines that the lane division line 111 is linear and the curvature of the road is equal to or less than a preset threshold. The preset range may be set as a range of 100 meters in front of the subject vehicle, for example.

Figure 3:
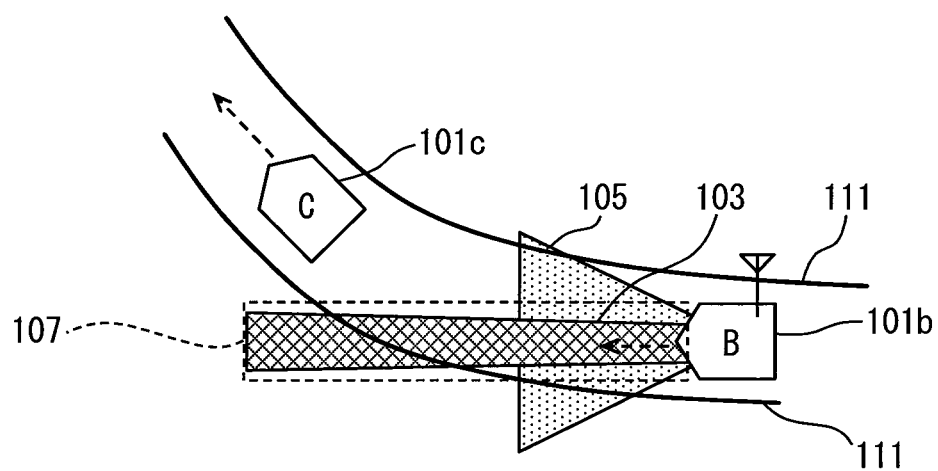
FIG. 3 is an illustration of a road in front of the subject vehicle, which is in this case a curved road.

On the other hand, in an example of FIG. 3, the in-vehicle device 1 of the vehicle 101b cannot detect any vehicle in the preset range 107, because the road traveled by the vehicle 101b is a curved road and a vehicle 101c exists out of the preset range 107, i.e., at a far-away position in the curved road. That is, the lane division line 111 is determined as curved, and the in-vehicle device 1 determines that the curvature of the road exceeds a preset threshold.

In other words, when the curvature of the road exceeds the preset threshold, the reliability of the information about the vehicle detection is not high.

Figure 4:
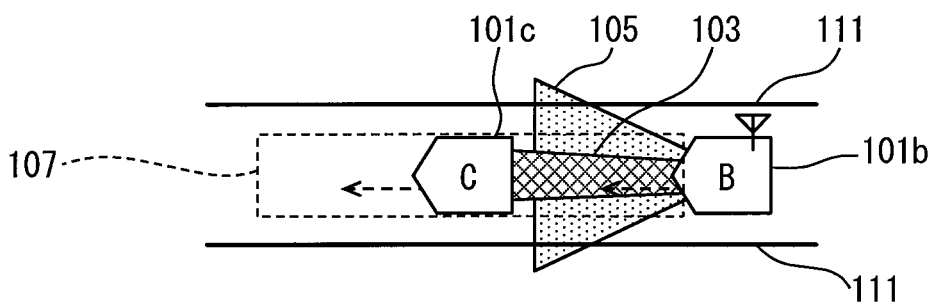
FIG. 4 is an illustration of a situation around the subject vehicle in which an other vehicle exists in front of the subject vehicle.

Next, in an example shown in FIG. 4, since a vehicle C (i.e., a vehicle 101c) exists in the detection range 103, the in-vehicle device 1 of the vehicle 101b determines that a vehicle exists in the preset range 107.

Figure 5:
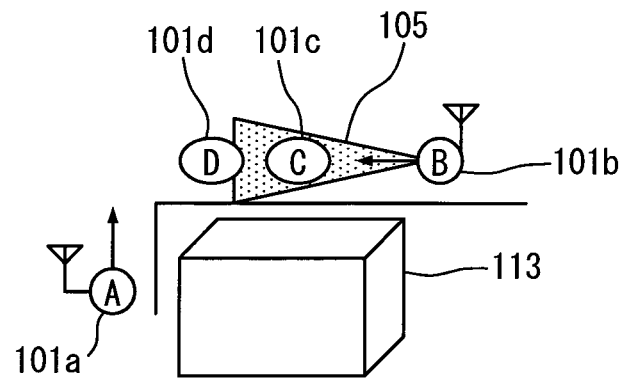
FIG. 5 is an illustration of a situation around the subject vehicle in which a vehicle exists in front of the other vehicle existing in front of the subject vehicle.

Now, in an example of FIG. 5, the in-vehicle device 1 of the vehicle 101b detects only the vehicle 101c in the detection range 103, but, does not detect a vehicle 101d that is also in the same detection range 103. This is because the detection range 103 (i.e., a laser beam of the radar 11 in the vehicle 101b) is interfered with the vehicle 101c and does not cover an area in front of the vehicle 101c.

In other words, it is determined that a vehicle, i.e., the vehicle 101c, exists in the preset range 107, at least. But, at the same time, it is not clearly determined whether any vehicle exists in front of the vehicle 101c.

That is, the vehicle detection in the preset range 107 inevitably means that there is a certain range or a certain area in which whether a vehicle exists or not is uncertain.

Based on the above reasoning, the in-vehicle device 1 transmits, to the in-vehicle device 1 on the other vehicles, based on the two conditions, i.e., (i) when the vehicle does not exists in the preset range 107 and (ii) when the curvature of the road is equal to or less than a preset threshold.

(3) Process in the In-vehicle Device 1

Figure 6:
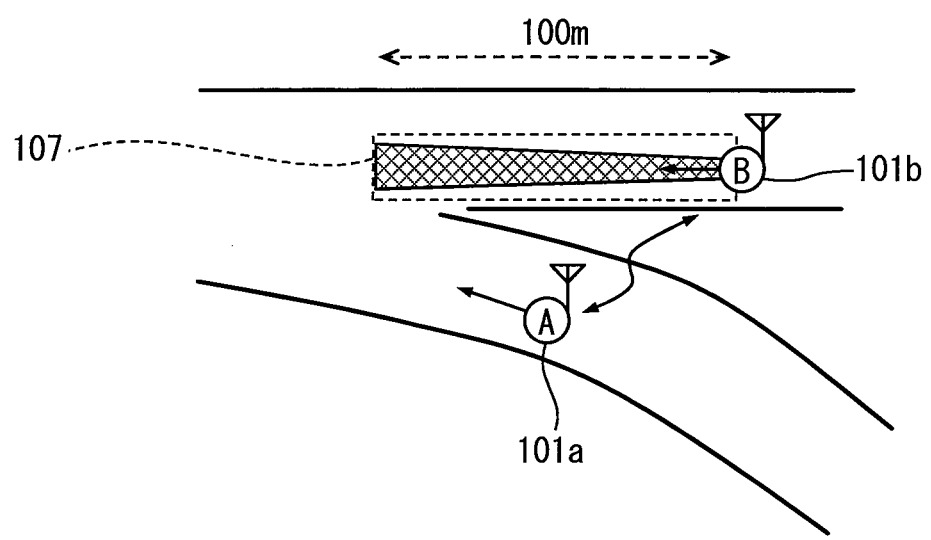
FIG. 6 is an illustration of a situation in which two roads merge in front of the subject vehicle.

An example process performed in the in-vehicle device 1 when the device 1 receives data is described with reference to FIG. 6. FIG. 6 is an illustration of a merge point where two roads merge, and the vehicle 101a travels on one of the two roads, while the vehicle 101b travels on the other. After a merge point, the vehicle 101a and the vehicle 101b travel on the same road as time lapses.

When the in-vehicle device 1 in the vehicle 101b determined, prior to merging, that no vehicle exists in the preset range 107, the in-vehicle device 1 in the vehicle 101b transmits the subject vehicle information, the range position information, and the vehicle presence information to the in-vehicle device 1 in the vehicle 101a with the radio communicator 15.

The in-vehicle device 1 in the vehicle 101a receives information with the radio communicator 15. The calculator 21 (i.e., the information processor 39) of the in-vehicle device 1 in the vehicle 101a detects a position of the preset range 107 based on the received information and the position of the vehicle 101a, that is, the position of the preset range 107 with reference to the vehicle 101a. The position of the preset range 107 may also be described as a position of the preset range by which the in-vehicle device 1 in the vehicle 101b has determined whether any vehicle exists in such a preset range. In this case, the calculator 21 can reliably determine that no vehicle exists in the preset range 107, the in-vehicle device 1 can reliably/safely use such information for the guidance operation for the driver, travel speed control in the auto-driving operation, lane selection control or the like.

Figure 7:
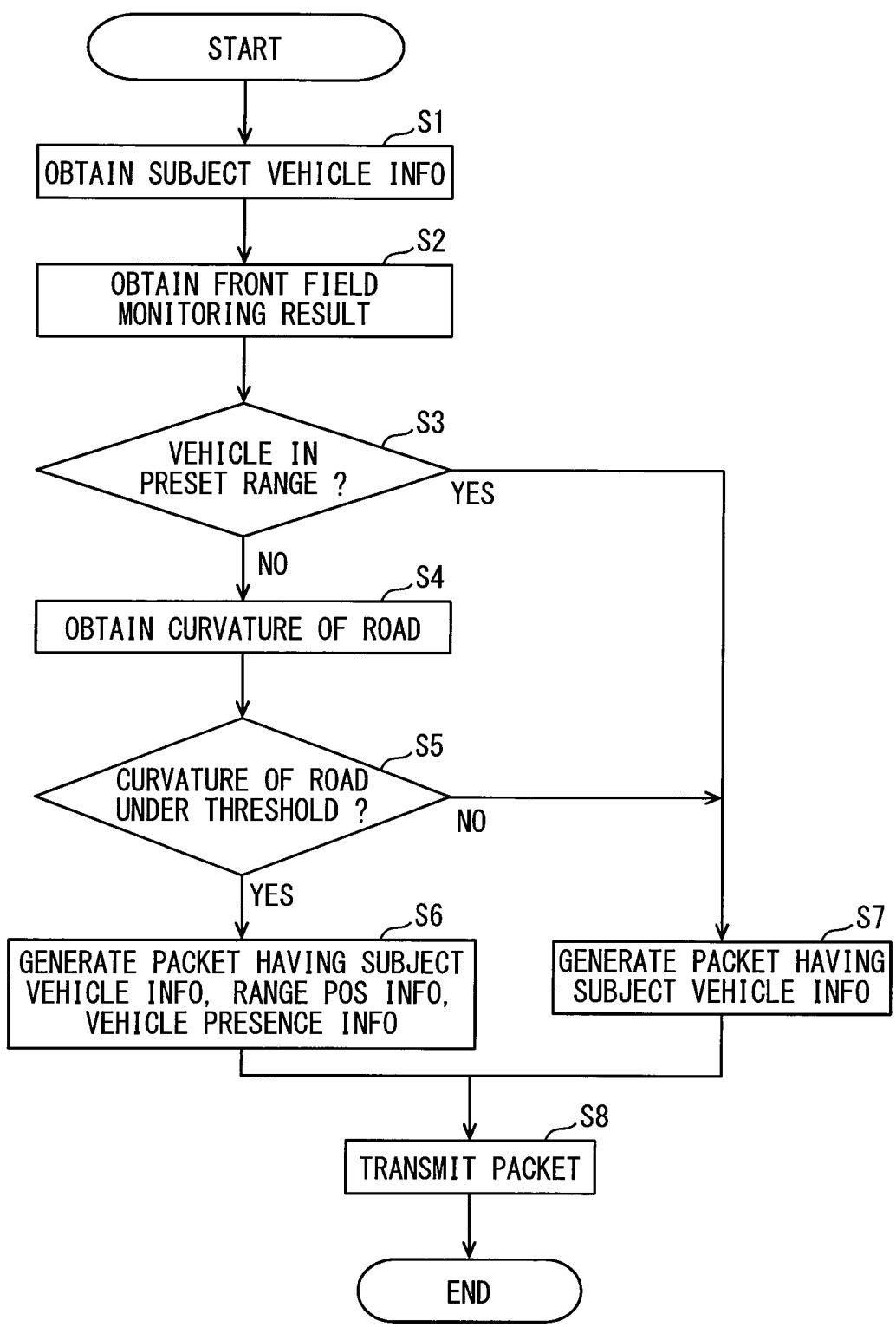
FIG. 7 is a flowchart of a process that is performed by an arithmetic unit of the in-vehicle device.

Next, an information transmission process performed by the calculator 21 of the in-vehicle device 1 in the vehicle 101b is described based on the flowchart in FIG. 7. The present process is performed at predetermined intervals, while the in-vehicle device 1 is operating (i.e., when a power supply for accessories is turned to ON).

In this process, the subject vehicle information is first obtained in S1. The subject vehicle information is information on a CAN (i.e., Control Area Network, which is not illustrated) and information including a vehicle speed, a yaw rate, etc., in addition to the current position information of the subject vehicle.

A front field monitoring result is then obtained in S2. More practically, when the detection signal is obtained from the laser radar 11, a vehicle in the preset range 107 is detected based on the obtained signal, and the detection result the vehicle is obtained.

Then, in S3, it is determined whether any vehicle is detected in the preset range. If no vehicle is detected in the preset range (S3:NO), the process proceeds to S4. On the other hand, if any vehicle is detected in the preset range (S3:YES), the process proceeds to S7.

The curvature of the road is obtained in S4. In this case, based on the captured image of the camera 13, the curvature of the road in the travel direction of the subject vehicle is calculated.

Then, in S5, the curvature of the road is determined in terms of whether it is equal to or less than a preset threshold. If the curvature of the road is equal to or less than a preset threshold (e.g., if the curvature is equal to or less than 0.01 (i.e., a curvature radius is equal to or greater than 100 m)) (S5:YES), the process proceeds to S6. On the other hand, if the curvature of the road exceeds the preset threshold (S5:NO), the process proceeds to S7.

In S6, a packet which stores the data of the subject vehicle information, the range position information, and the vehicle presence information is generated.

In S7, the packet which stores the data of the subject vehicle information is generated.

Then, in S8, the packet generated either in S6 or in S7 is transmitted to an outside of the subject vehicle via the radio communicator 15. Then, this process is ended.

(4) Effects of the Disclosure

The in-vehicle device 1 of the present embodiment is an information transmitter installed and used in the vehicle 101. The in-vehicle device 1 includes: the radio communicator 15 (i.e., a data transmission section) that wirelessly transmits data to the in-vehicle device 1 in the vehicles other than the subject vehicle; the vehicle position detector 31 (i.e., a vehicle position detector) which obtains the information that is usable for detecting the position of the subject vehicle and detects the position thereof; the vehicle detector 33 (i.e., a vehicle detector) which detects the vehicle 101 existing in the preset range 107 in the travel direction of the subject vehicle; the road curvature obtainer 35 (i.e., a curvature obtainer) which obtains the curvature of the road in the travel direction of the subject vehicle, and the information generator 37 (i.e., a transmission controller) which controls the radio communicator 15 to transmit the range position information and the vehicle presence information.

Further, the information generator 37 is configured to transmit the range position information and the vehicle presence information via the radio communicator 15, when the curvature of the road obtained by the curvature obtainer 35 is equal to or less than a preset threshold. On the other hand, when the above-mentioned curvature exceeds the preset threshold, the information generator 37 is configured not to transmit the range position information and the vehicle presence information via the radio communicator 15.

Since the in-vehicle device 1 of the present embodiment transmits the range position information and the vehicle presence information to an outside of the subject vehicle only when the curvature of the road is equal to or less than a preset threshold, the in-vehicle device 1 in the other vehicles is prevented from receiving low reliability information and is also prevented from performing an inappropriate process based on the low reliability information. Further, by preventing the transmission of the low reliability information, the in-vehicle device 1 enables a reduction of information communication traffic.

Although the present disclosure has been described in connection with preferred embodiment thereof with reference to the accompanying drawings, it is to be noted that various changes and modifications will become apparent to those skilled in the art.

For example, the configuration of the present embodiment which does not transmit both of the range position information and the vehicle presence information may be changed to a different configuration, in which only one of the range position information and the vehicle presence information may be not transmitted. Even in such configuration, use of the low reliability information is prevented, since such information is not usable when only one of the range position information and the vehicle presence information is received by the in-vehicle device 1.

Further, the configuration which uses the radio communicator 15 for a vehicle-to-vehicle communication in the present embodiment may be changed to a different configuration, in which communications between vehicles is performed not directly but is performed indirectly. For example, the in-vehicle device 1 on each of the vehicles may perform road-to-vehicle communications with roadside devices that are disposed along the road, and the communications between vehicles may be enabled via the roadside devices. Further, communication methods as well as data format may be not limited to a particular type.

In the in-vehicle device 1 of the present embodiment, the information generator 37 controls the radio communicator 15 to transmit no-vehicle detected information that indicates that no vehicle 101 is detected in the preset range 107 by the vehicle detector 33 when the vehicle detector 33 detects no vehicle 101 in the preset range 107, and controls the radio communicator 15 not to transmit the vehicle presence information when the vehicle detector 33 detects the vehicle 101 in the preset range 107.

The in-vehicle device 1 configured in the above-mentioned manner does not transmit the vehicle presence information in an "uncertain" situation in which (i) at least one vehicle 101 has been detected in the preset range 107, but (ii) it is uncertain that whether the other vehicles exist in the preset range 107. The in-vehicle device 1 transmits the vehicle presence information only when the vehicle does not exist in the preset range 107. In other words, the in-vehicle device 1 transmits highly-reliable information only. The highly-reliable information is the information that indicates that no vehicle 101 exists in the preset range 107.

Further, the information transmission scheme may be configured to transmit information that indicates that the other vehicle exists in the preset range as the vehicle presence information, because such information (i.e., information indicating that at least one vehicle exists) may be usable for avoiding a dangerous situation or the like. The vehicle presence information may simply be the information indicating that a vehicle exists in the preset range 107, or the information that includes the position information indicative of the detected position of the vehicle 101.

In the present embodiment, the curvature obtainer 35 calculates the curvature of the road based on the lane division line extracted from the image of the road surface captured with the camera 13 imaging the road surface in the travel direction of the subject vehicle. Since the lane division line clearly defines a travel path of the vehicle, it is usable to appropriately determine the curvature of the road.

Further, the curvature of the road may be calculated from data other than the image captured with the camera 13. For example, the curvature of the road may be calculated based on the detection signal from at least one of the steering angle sensor for detecting the steering angle of the subject vehicle and the yaw rate sensor for detecting the yaw rate of the subject vehicle.

Further, the in-vehicle device 1 may have map information including the information on the curvature of the road stored therein, and the curvature of the road in the travel direction of the subject vehicle may be calculated based on the identified current position of the subject vehicle on a map based on such map information.

Further, the in-vehicle device 1 of the present embodiment may serve as an information receiver in a vehicle. The in-vehicle device 1 receives by the radio communicator 15 the range position information and the vehicle presence information transmitted by the radio communicator 15 of the in-vehicle device 1 in other vehicles (e.g., in the vehicle 101*b*), i.e., on a transmitting side vehicle that transmits the information.

Further, the in-vehicle device 1 has the vehicle position detector 31 that detects the position of the vehicle based on the obtained information that is usable for detecting the position of the vehicle 101*a* (i.e., a receiving-side vehicle) which is a vehicle having the in-vehicle device 1 disposed therein, and the information processor 39 that determines (i) the position of the preset range 107 with reference to the vehicle 101*a* and (ii) whether any vehicle exists in the preset range 107 of such a position (i.e., the position in (i)), based on (a) the range position information and the vehicle presence information received with the radio communicator 15 and (b) the position of the vehicle 101*a* detected by the vehicle position detector 31.

The in-vehicle device 1 of the present embodiment having the above configuration can reliably recognize and determine that there is no vehicle in the preset range, since the position of the preset range is determined with reference to the subject vehicle based on the received information, i.e., based on the range position information and the vehicle presence information. Therefore, the information determined in such manner is reliably/safely usable for the guidance operation for the driver, for the control of the auto-driving and the like.

Such changes, modifications. and summarized schemes are to be understood as being within the scope of the present disclosure as defined by appended claims.

What is claimed is:

1. An information transmitter installed in a subject vehicle, the information transmitter comprising:
   a data transmitter wirelessly transmitting data directly or indirectly to an information receiver of another vehicle;
   a vehicle position detector detecting a position of the subject vehicle by obtaining position determining information;
   a vehicle detector detecting a vehicle within a preset range that is positioned in front of the subject vehicle;
   a curvature obtainer obtaining a curvature of a road located in front of the subject vehicle; and
   a transmission controller controlling the data transmitter to transmit (i) range position information regarding a position of the preset range and (ii) vehicle presence information regarding whether the vehicle detector has detected any vehicle within the preset range, wherein
   when the curvature of the road obtained by the curvature obtainer is equal to or smaller than a threshold, the transmission controller controls the data transmitter to transmit the range position information and the vehicle presence information, the range position information and the vehicle presence information being received by the information receiver and used by an information processor to perform at least one of a guidance operation for a driver, travel speed control, and lane selection control, and when the curvature of the road obtained by the curvature obtainer is greater than the threshold, the transmission controller controls the data transmitter to not transmit the range position information and the vehicle presence information.

2. The information transmitter of claim 1, wherein the transmission controller controls the data transmitter (iii) to transmit, as the vehicle presence information, no-vehicle detected information that indicates that no vehicle is detected in the preset range by the vehicle detector when the vehicle detector detects no vehicle in the preset range, and (iv) to not transmit the vehicle presence information when the vehicle detector detects a vehicle in the preset range.

3. The information transmitter of claim 1, wherein the curvature obtainer calculates the curvature of the road based on a lane division line that is determined based on a road image of a road surface in front of the subject vehicle that is captured by a camera.

4. The information transmitter of claim 1, wherein the curvature obtainer calculates the curvature of the road based on at least one of a detection signal from a steer angle sensor that detects a steer angle of the subject vehicle and a detection signal from a yaw rate sensor that detects a yaw rate of the subject vehicle.

5. The information transmitter of claim 1, wherein the transmission controller controls the data transmitter to transmit the range position information and the vehicle presence information to the information receiver of another vehicle based on whether the curvature of the road obtained by the curvature obtainer is equal to or smaller than the threshold.

6. The information transmitter of claim 1, wherein the data transmitter is a radio communicator.

7. An information transmitter installed in a subject vehicle, the information transmitter comprising:
- a data transmitter wirelessly transmitting data directly or indirectly to an information receiver of another vehicle;
- a vehicle position detector detecting a position of the subject vehicle by obtaining position determining information;
- a vehicle detector detecting a vehicle within a preset range that is positioned in front of the subject vehicle;
- a curvature obtainer obtaining a curvature of a road located in front of the subject vehicle; and
- a transmission controller controlling the data transmitter to transmit subject vehicle information detected by the vehicle position detector and indicative of the position of the subject vehicle, (i) range position information regarding a position of the preset range and (ii) vehicle presence information regarding whether the vehicle detector has detected any vehicle within the preset range, wherein when the curvature of the road obtained by the curvature obtainer is equal to or smaller than a threshold, the transmission controller controls the data transmitter to transmit the subject vehicle information, the range position information and the vehicle presence information, and when the curvature of the road obtained by the curvature obtainer is greater than the threshold, the transmission controller controls the data transmitter to transmit the subject vehicle information and not to transmit the range position information and the vehicle presence information.

8. An information transmitter comprising:
- a data transmitter wirelessly transmitting data directly or indirectly to an information receiver of another vehicle;
- a vehicle position detector detecting a position of the subject vehicle by obtaining position determining information;
- a vehicle detector detecting a vehicle within a preset range that is positioned in front of the subject vehicle;
- a curvature obtainer obtaining a curvature of a road located in front of the subject vehicle; and
- a transmission controller controlling the data transmitter to transmit subject vehicle information detected by the vehicle position detector and indicative of the position of the subject vehicle, (i) range position information regarding a position of the preset range and (ii) vehicle presence information regarding whether the vehicle detector has detected any vehicle within the preset range, wherein the transmission controller controls the data transmitter (iii) to transmit, as the vehicle presence information, the subject vehicle information, the range position information, and no-vehicle detected information that indicates that no vehicle is detected in the preset range by the vehicle detector when the vehicle detector detects no vehicle in the preset range, on condition that the curvature of the road obtained by the curvature obtainer is equal to or less than the threshold, and (iv) to transmit the subject vehicle information and to not transmit the range position information and the vehicle presence information when the vehicle detector detects a vehicle in the preset range, without regard to the curvature of the road.

* * * * *